United States Patent
Nagar et al.

(10) Patent No.: US 12,013,747 B2
(45) Date of Patent: Jun. 18, 2024

(54) DYNAMIC WINDOW-SIZE SELECTION FOR ANOMALY DETECTION

(71) Applicant: INTERNATIONAL BUSINESS MACHINES CORPORATION, Armonk, NY (US)

(72) Inventors: Seema Nagar, Bangalore (IN); Pooja Aggarwal, Bengaluru (IN); Rohan R Arora, Champaign, IL (US); Amitkumar Manoharrao Paradkar, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 17/884,756

(22) Filed: Aug. 10, 2022

(65) Prior Publication Data
US 2024/0054041 A1 Feb. 15, 2024

(51) Int. Cl.
G06F 11/00 (2006.01)
G06F 11/07 (2006.01)

(52) U.S. Cl.
CPC ...... *G06F 11/0787* (2013.01); *G06F 11/0721* (2013.01)

(58) Field of Classification Search
CPC .......... G06F 11/0787; G06F 11/0721
See application file for complete search history.

(56) References Cited

U.S. PATENT DOCUMENTS

| | | | | |
|---|---|---|---|---|
| 11,809,267 B2 * | 11/2023 | Gusat | ............. | G06F 11/0709 |
| 2016/0241576 A1 | 8/2016 | Rathod | | |
| 2019/0243743 A1 | 8/2019 | Saxena | | |
| 2020/0174902 A1 | 6/2020 | Buda | | |
| 2020/0250066 A1 | 8/2020 | Dang | | |
| 2022/0382856 A1 * | 12/2022 | Yang | ............. | G06F 21/55 |
| 2023/0069074 A1 * | 3/2023 | Chen | ............. | G06F 11/3447 |
| 2023/0376372 A1 * | 11/2023 | Chen | ............. | G06F 11/0769 |
| 2023/0376589 A1 * | 11/2023 | Chen | ............. | G06F 21/552 |

FOREIGN PATENT DOCUMENTS

CN 113660237 A 11/2021

OTHER PUBLICATIONS

Ahmed et al., "Anomaly Detection, Localization and Classification Using Drifting Synchrophasor Data Streams", IEEE Transactions on Smart Grid, vol. 12, Issue: 4, Jul. 2021, pp. 3570-3580, Date of Publication: Jan. 26, 2021, <https://ieeexplore.ieee.org/abstract/document/9335975>.

(Continued)

*Primary Examiner* — Amine Riad

(74) *Attorney, Agent, or Firm* — David K. Mattheis

(57) ABSTRACT

Detecting system log anomalies by receiving multivariate time-series system log data an multivariate metric data, inferring system metrics from the system log data and metric data, receiving a metric causal graph including causal relationships between system metrics, determining a univariate variation score for the system metrics, determining a causal variation score for the multivariate time series system metric data, according to the causal graph, determining an overall activity score according to the univariate variation score, and causal variation score, and altering a review window duration according to the activity score.

20 Claims, 4 Drawing Sheets

(56) References Cited

OTHER PUBLICATIONS

Dalmazo, "A Prediction-based Approach for Anomaly Detection in the Cloud", 150 pps., Department of Informatics Engineering Faculty of Sciences and Technology, University of Coimbra, Oct. 2018, <https://sol.sbc.org.br/index.php/sbrc_estendido/article/view/7786>.

Du et al., "DeepLog: Anomaly Detection and Diagnosis from System Logs through Deep Learning", CCS '17: Proceedings of the 2017 ACM SIGSAC Conference on Computer and Communications Security, Oct. 2017, pp. 1285-1298, <https://dl.acm.org/doi/abs/10.1145/3133956.3134015>.

Landauer et al., "Dynamic log file analysis: An unsupervised cluster evolution approach for anomaly detection", Computers & Security, vol. 79, 2018, pp. 94-116, <https://www.sciencedirect.com/science/article/pii/S0167404818306333>.

Mell et al., "The NIST Definition of Cloud Computing", National Institute of Standards and Technology, U.S. Department of Commerce, NIST Special Publication 800-145, Sep. 2011, 7 pages.

Wang et al., "Self-adaptive cloud monitoring with online anomaly detection", Future Generation Computer Systems, vol. 80, Issue C, Mar. 2018, pp. 89-101, <https://www.sciencedirect.com/science/article/abs/pii/S0167739X1730376X>.

\* cited by examiner

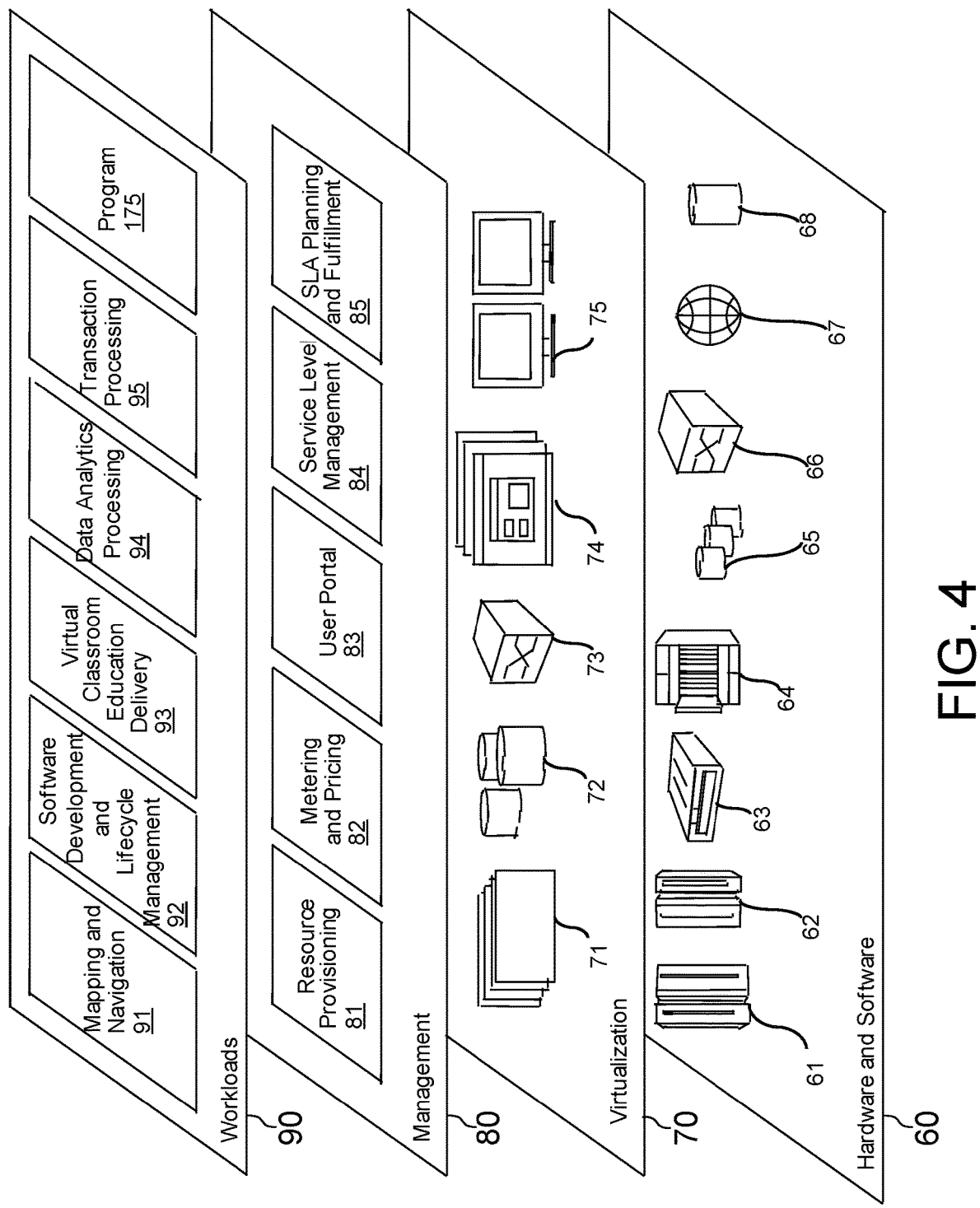

DYNAMIC WINDOW-SIZE SELECTION FOR ANOMALY DETECTION

FIELD OF THE INVENTION

The disclosure relates generally to the detection of anomalies in system log data. The invention relates particularly to the dynamic selection of window sizes for anomaly detection.

BACKGROUND

Anomaly detection methods review streaming datasets and detect data which is relatively anomalous in comparison other data in the data set. Such methods function by reviewing data in backward-looking time windows such that at a time T1, the method considers all data in the dataset corresponding to the window T1-D, where D is a fixed duration for the backward-looking window.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable dynamic alteration of system log data anomaly-detection time-window duration.

Aspects of the invention disclose methods, systems and computer readable media associated with detecting system log anomalies by receiving multivariate time-series system log data and multivariate time-series metric data, inferring system metrics from the system log data and metric data, receiving a metric causal graph including causal relationships between system metrics, determining a univariate variation score for the system metrics, determining a causal variation score for the multi-variate time series system metric data according to the causal graph, determining an activity score according to the univariate variation score, and causal variation score, and altering a review window duration according to the activity score.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4 depicts abstraction model layers, according to an embodiment of the invention.

DETAILED DESCRIPTION

Figure 1:
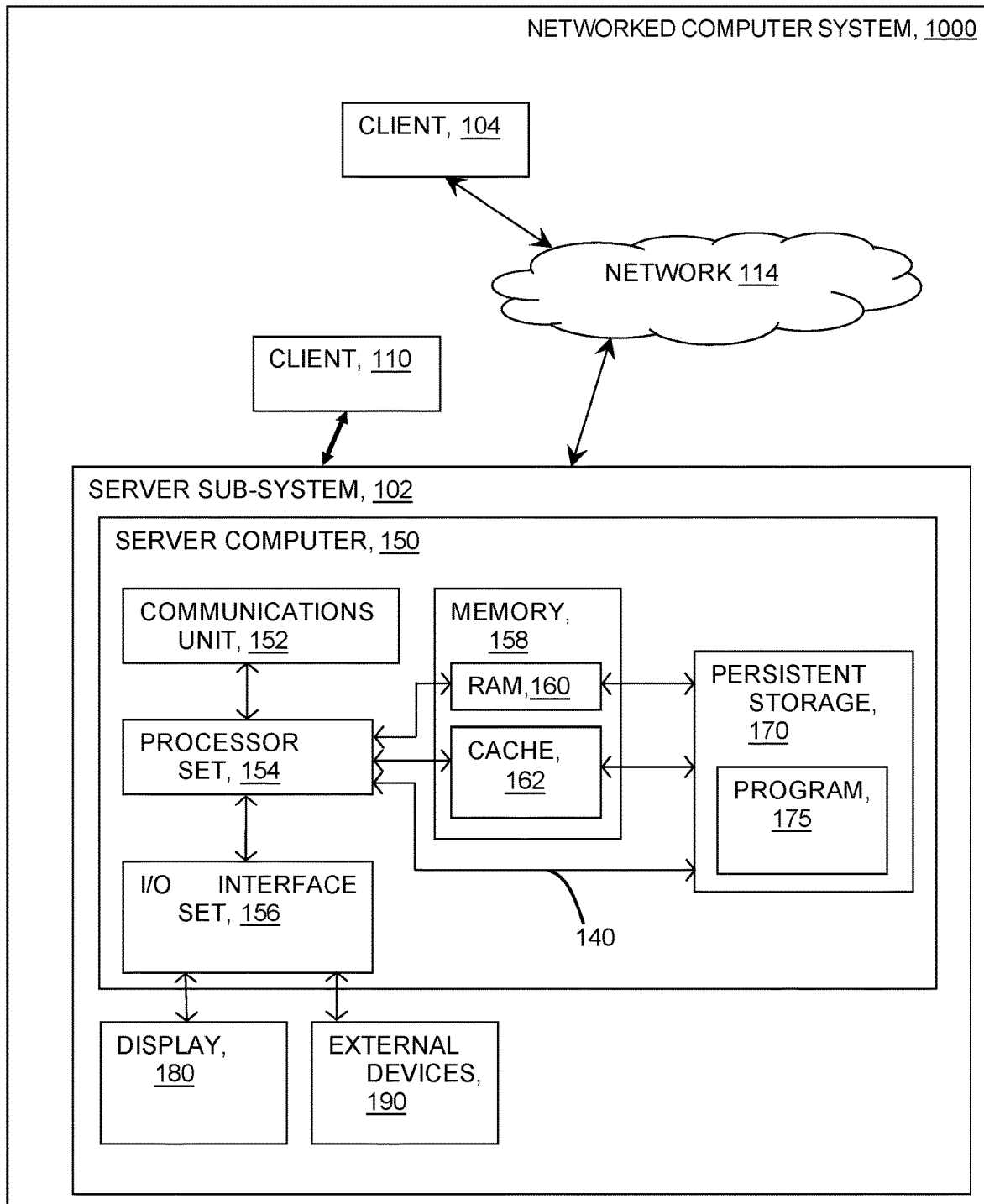
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

A distributed system, such as applications on a cloud system, may exhibit anomalous behavior. Maximizing the availability of a cloud application requires detecting the anomalous behavior. Many methods have been proposed in the literature to detect anomalies either using logs produced by the application or the system metrics, or any other source of information. The anomaly detection methods may utilize timeseries based forecasting, or outlier detection techniques, including supervised or unsupervised techniques. A typical cloud application has streaming logs or metrics coming in. The anomaly detector techniques work on top of the streaming logs by sampling a duration of logs or metrics a.k.a window size. Methods typically utilize preconfigured window durations, determined by conducting experimentation in a test bed. Window sizes pre-configured based on experimentation do not reflect actual real time conditions. For example, when the cloud application has been quiet, with not lot of activities are going in the application, the application is more or less stable but still anomaly detection would take the same window size of data and keep repeating often. As another example, there may be a burst of activities, but the anomaly detection techniques still wait the entire window duration to get the data.

An anomaly detector utilizing a fixed size window can miss anomalies having signatures spread across multiple consecutive fixed size windows, or short duration signatures buried within a very small portion of a fixed size window. Disclosed embodiments enable dynamically altering streaming log anomaly detection window durations according to changes in system metrics.

Aspects of the present invention relate generally to anomaly detection systems and, more particularly, to unsupervised dynamic anomaly detection window duration determination. In embodiments, an anomaly detection system receives streaming log and system performance data from one or more cloud systems and applications, determines an activity score according to the received data, and adjusts the anomaly detection window according to the activity score. High activity scores lead to a reduction in the duration of the detection window duration, while low activity scores lead to an increase in the duration of the anomaly detection window. According to aspects of the invention, the anomaly detection system automatically and dynamically adjusts window duration as a reflection of the level of system activity, which disclosed systems and methods determine according to changes in direct and inferred system metrics, as well as detected changes in causal relationships between metrics. In this manner, implementations of the invention continually adjust the window duration such that the anomaly detection system utilizes a detection window most appropriate for a current level of system activity and adjusts that window duration as the level of system activity changes over time.

In accordance with aspects of the invention a method automatically adjusts a review window duration utilized by an anomaly detection method. Anomaly detection utilizes time series data associated with a detection window to identify anomalies. Window size affects anomaly detection methods as a large window size may reduce the likelihood of detecting short duration anomalies, while a short duration window may impair the ability to detect long duration anomalies. Methods compute changes in system metrics over time and determine an overall activity score for the system. Metric changes include metric velocity, metric acceleration, and causal relationship changes compared to a baseline causal relationship graph for the system. Methods then adjust window size according to the level of activity reflected in the computed activity score.

Aspects of the invention provide an improvement in the technical field of anomaly detection systems. Conventional anomaly detection systems utilize static (i.e., unchanging) window durations when detecting anomalies from time-series data. In many cases, anomaly characteristics make detection using a fixed duration difficult or unlikely. As a result, the static window results in a failure to detect anomalies. As conditions change, disclosed method detect those changes and alter the window duration to reflect the changes in system activity, increasing the likelihood of anomaly detection. Implementations of the invention results in continuously updated window durations reflecting current system conditions and maximizing the anomaly detection possibilities.

Aspects of the invention also provide an improvement to computer functionality. In particular, implementations of the invention are directed to a specific improvement to the way anomaly detection systems operate, embodied in the continually adjusted window duration that reflects current system activities related to the presence of anomalies. In embodiments, the system adjusts the window duration over time as system conditions change, as reflected in changes, and rates of change, of system metrics, such that the currently utilized window duration differs from the window duration utilized under different system activity conditions. As a result of adjusting the window duration for the next anomaly detection analysis based on the current system activity levels, the system increases the likelihood that the system will detect any existing anomalies. In this manner, embodiments of the invention affect how the anomaly detection system functions (i.e., the likelihood of detecting an anomaly) from one window duration to the next.

As an overview, an anomaly detection system application executes on data processing hardware and detects deviations from normal system behavior. The anomaly detection system receives inputs from various sources including time series data from applications and system performance logs, as well as a defined causal relationship graph indicating known relationships between various data metrics. Data storage devices store the timeseries data. Methods analyze the timeseries data in discrete time-based groupings,—window—and use timeseries-based forecasting or outlier detection techniques, to identify data indicative of anomalous activity. Altering the analysis window sizing according to activity observed in the data increases the effectiveness of the anomaly detection methods.

In an embodiment, one or more components of the system can employ hardware and/or software to solve problems that are highly technical in nature (e.g., receiving streaming multivariate time-series log data, inferring system metrics from the log data, receiving a metric causal relationship graph, determining a univariate variation score for the system metrics, determining a causal variation score for the multivariate time series metric data, determining an activity score, altering a review window according to the activity score, etc.). These solutions are not abstract and cannot be performed as a set of mental acts by a human due to the processing capabilities needed to facilitate improved anomaly detection, for example. Further, some of the processes performed may be performed by a specialized computer for carrying out defined tasks related to dynamic anomaly detection window definition. For example, a specialized computer can be employed to carry out tasks related to dynamic anomaly detection window duration adjustment or the like.

In an embodiment, systems and methods receive data logs associated with one or more applications being executed by the system. Such data logs may include application incident and performance logs, as well as system performance logs and system and application support logs. Systems and methods further receive system metric data. The data generally includes timeseries data reflecting system and application performance metric values over time. The data may be multivariate, including any number of variable metrics related to the applications and system performance. In this embodiment, the system and methods may further infer additional metrics from the data, such as a determined response time for a request, a number of detected errors, or response latency. In an embodiment, natural language processing (NLP) may be used to analyze portions of the data to extract details regarding entities, sentiment, etc., used for anomaly detection.

In an embodiment, systems and methods further receive a baseline causal graph depicting relationships between known metrics found or inferred from the dataset. Such a causal graph may further include indications of the strength of the respective relationships depicted. In this embodiment, the causal graph may initially be prepared by a Subject Matter Expert (SME) familiar with a particular system, application and the associated metrics of the application and system.

Systems and methods analyze the metrics of the log data and determine a metric velocity and metric acceleration for each direct and inferred metric. Metric velocity refers to the rate of change in the value of the metric and metric acceleration refers to the rate of change of the metric velocity. For example, as time passes, the analysis window shifts forward and new metric values occur. The method evaluates the changing metric values and determines the metric velocity and metric acceleration for each new window analyzed. The method determines an average metric velocity and acceleration for each new analysis window and designates the modes of the sets of average metric velocities and average metric accelerations as the current metric velocity and metric acceleration scores for the current detection window size duration. For each metric, the method combines the current velocity and acceleration scores yielding a variation score for the current metric/window size combination. In an embodiment, the method normalizes the set of current variation scores across the set of all direct and inferred metrics and determines a current univariate variation score for the current window size.

In an embodiment, systems and methods further analyze the metrics data to detect relationships among different variable metrics. Method may utilize Bayesian analysis or similar causal dependency analysis to generate a causal graph depicting the identified causal relationships in the data. In this embodiment, the method then compares the identified causal relationships to those depicted in the provided causal relationship graph and determines differences between the current and base causal relationships graphs. Systems and methods translate the determined differences into a causal variation score reflecting the magnitude of the changes found between the two graphs.

In an embodiment, the method further receives data from any metric-based anomaly detection method currently analyzing the received streaming data. Systems and methods interpret such detected metric-based anomaly data as a metric-based anomaly score with larger scores reflecting a larger number of detected metric-based anomalies in the current backward-looking data window. In this embodiment, the method adds the metric-based anomaly scores to the univariate variation score and the causal variation scores in determining the overall activity scores used to adjet the window sizing.

In an embodiment, systems and methods combine the univariate variation score, the causal variation score and the anomaly score to determine an overall activity score for the current window duration from the analyzed log data. In an embodiment, the method assigns equal weights to each of the three scores in making the combination. In an embodiment, the method weights the scores differently in determining the activity score. In this embodiment, the method assigns weights according to external score weighting guidance provided by one or more subject matter experts.

In an embodiment, the system and method utilize the overall activity score to adjust, or alter, the current backward-looking data window duration. In an embodiment, the methods compare the most recently determined current activity score to the immediately preceding activity score and adjust the window duration according to the difference. The adjustment varies inversely to the difference in the activity scores. For example, for instances where the current activity score exceeds the previous score, i.e., a greater current activity score, the method reduces the window duration. For instances where the current activity score has a lower magnitude than the preceding activity score, i.e., a lesser current activity score, the method increases the duration. Therefore, as the activity score increases, the window duration decreases, and as the activity score decreases, the window duration increases. For more activity in the system the window duration decreases to capture shorter duration anomalies, and as activity decreases, window duration increases to increase sensitivity to the detection of longer duration anomalies. Throughout the window duration adjustment process, the anomaly detection methods continue to process windows of data and detect anomalies as described above.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise the dynamic anomaly detection window adjustment program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the anomaly detection program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., anomaly detection program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
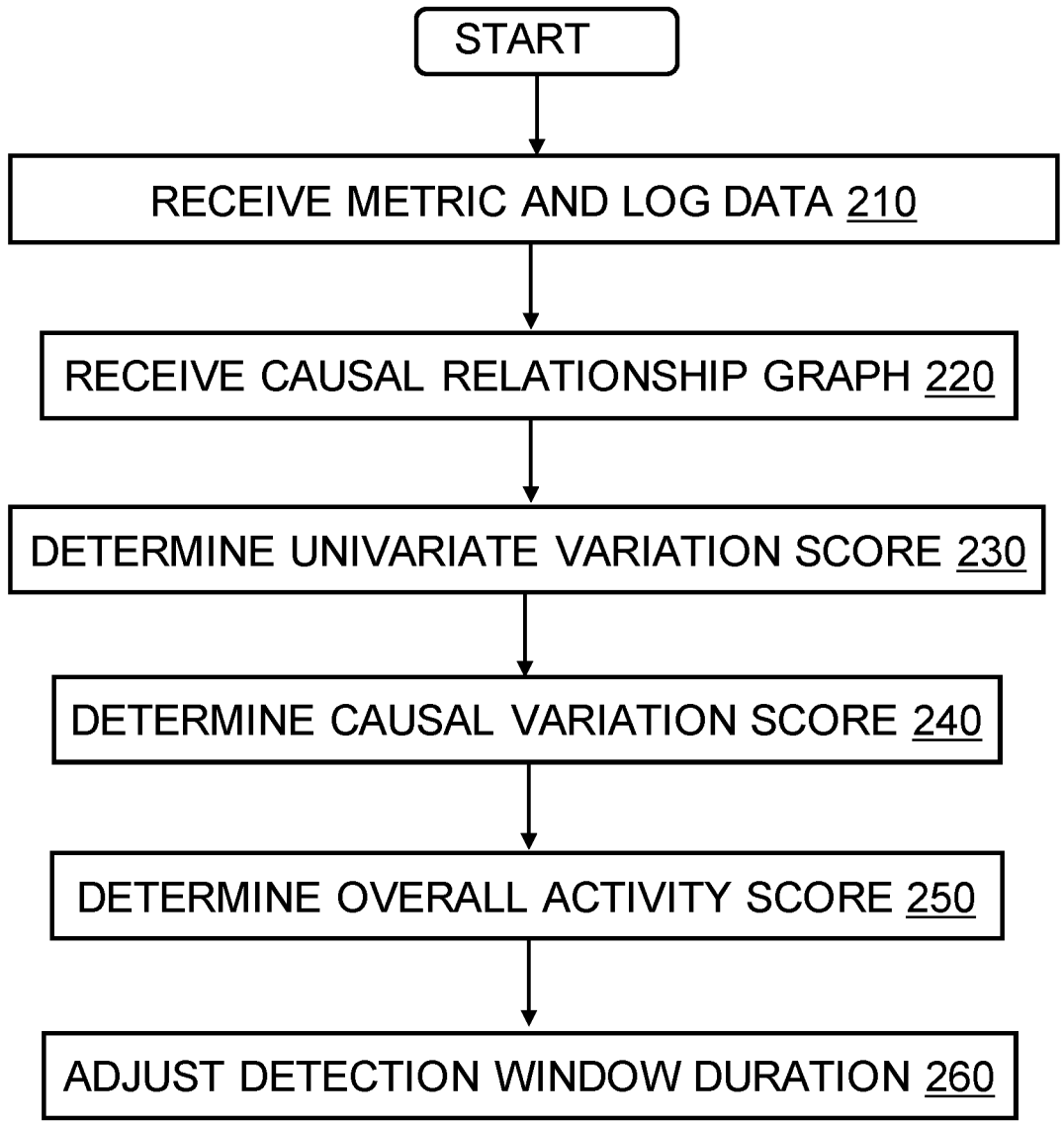
FIG. 2 provides a flowchart depicting an operational sequence, according to an embodiment of the invention.

FIG. 2 provides a flowchart 200, illustrating exemplary activities associated with the practice of the disclosure. After program start, at block 210, systems and methods receive multivariate timeseries system and application log data and multivariate timeseries system metric data. This data may include log entry data, direct metrics generated by system and application resources, and disclosed methods may further infer indirect metrics from the data. Received data is timestamped indicating the time of occurrence of the associated data.

At block 220, systems and methods receive a baseline causal relationship graph for the system and application metrics. Such a causal relationship graph may be prepared by a subject matter expert familiar with the metrics of the intended target system and/or application. The baseline causal relationship graph serves as a basis for determining causal variations in metric relationships over time as detected by the window duration adjustment methods.

At block 230, systems and methods determine univariate variations scores for the metrics using the current window duration of the anomaly detection methods in place. The systems and methods analyze the metrics of the log data and metric data and determine a metric velocity and metric acceleration for each direct and inferred metric. Metric velocity refers to the rate of change in the value of the metric, and metric acceleration refers to the rate of change of the metric velocity. For example, as time passes, the analysis window shifts forward and new metric values occur. The method evaluates the changing metric values and determines the metric velocity and metric acceleration for each new window analyzed. The method determines an average metric velocity and average metric acceleration for each new analysis window and designates the modes of the sets of average velocities and average accelerations as the current metric velocity scores and metric acceleration scores for each metric for the current metric window size duration. For each metric, the method combines the current velocity and acceleration scores yielding a variation score for the current metric/window size combination. In an embodiment, the method normalizes the set of current variation scores across the set of all direct and inferred metrics and determines a current univariate variation score across the set of metrics for the current window size.

At block 240, systems and methods of the anomaly detection window duration adjustment program determine a causal variation score by utilizing the baseline causal relationship graph. In an embodiment, systems and methods analyze the metrics data to detect relationships among different variable metrics. Method may utilize Bayesian analysis or similar causal dependency analysis to generate a causal graph depicting the identified causal relationships in the data. In this embodiment, the method then compares the identified causal relationships to those depicted in the provided causal relationship graph and determines differences between the current and base causal relationships graphs. Systems and methods translate the determined differences into a causal variation score reflecting the magnitude of the changes found between the two graphs.

At block 250, systems and methods determine an overall activity score for the current window duration. In an embodiment, systems and methods combine the univariate variation score, the causal variation score and any available metric anomaly score, to determine an overall activity score for the current window duration from the analyzed log data. In an embodiment, the method assigns equal weights to each of the three scores in making the combination. In an embodiment, the method weights the scores differently in determining the activity score.

At block 260, systems and methods adjust the current backward-looking window duration according to the inverse of the overall activity score. In an embodiment, the system and method compare the most recently determined overall activity score to the immediately preceding activity score and adjust the window duration according to the difference. The adjustment is inversely proportional to the difference in the activity scores. For example, for instances where the current activity score has a greater magnitude than the previous score, i.e., a greater current than preceding activity score, the method reduces the window duration. For instances where the current activity score has a lower magnitude than the preceding activity score, i.e., a lesser activity score, the method increases the duration. Therefore, as the activity score increases, the window duration decreases, and as the activity score decreases, the window duration increases. For more activity in the system the window duration decreases to capture shorter duration anomalies, and as activity decreases, window duration increases to increase sensitivity to the detection of longer duration anomalies. Throughout the window duration adjustment process, the anomaly detection methods continue to process windows of data and detect anomalies as described above.

Following the alteration of the anomaly detection window size, the method continues the anomaly detection process utilizing an outlier detection, timeseries based forecasting, or other known anomaly detection methodologies.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
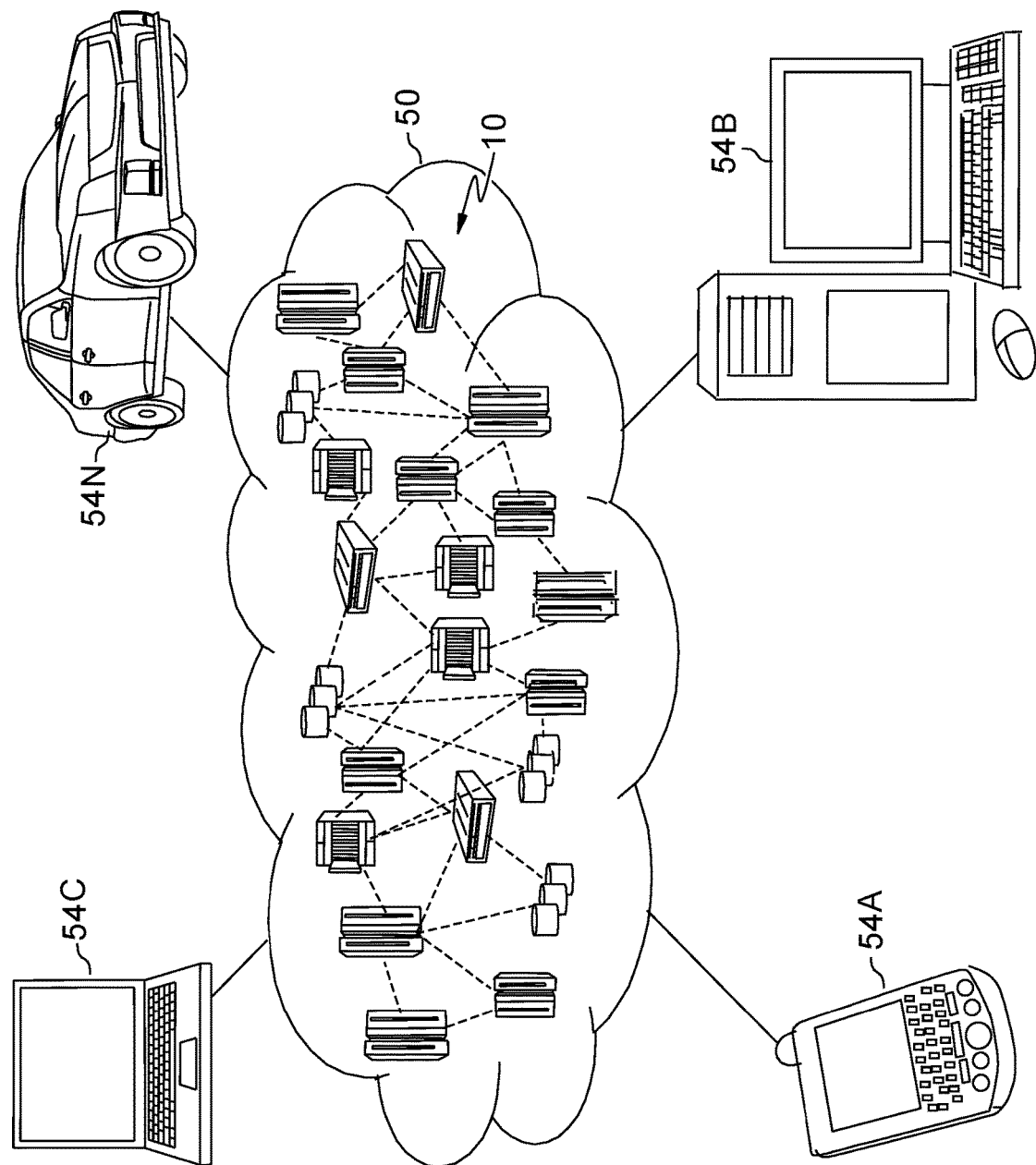
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for system log anomaly detection by:
    receiving, by one or more computer processors, multivariate time-series system log data and metric data;
    receiving, by the one or more computer processors, a metric data causal graph including causal relationships between system metrics;
    determining, by the one or more computer processors, a univariate variation score for the system metrics;
    determining, by the one or more computer processors, a causal variation score for the multivariate time series system metric data according to the causal graph;
    determining, by the one or more computer processors, an activity score according to the univariate variation score, and causal variation score;
    altering, by the one or more computer processors, a review window duration according to the activity score; and
    processing, by the one or more computer processors, windows of multivariate time-series system log data and metric data to detect anomalies.

2. The computer implemented method according to claim 1, further comprising:
    determining, by the one or more computer processors, a metrics anomaly score according to a metric-based anomaly detector; and
    determining, by the one or more computer processors, the activity score according to the metrics anomaly score, univariate variation score, and causal variation score.

3. The computer implemented method according to claim 1, wherein the univariate variation score comprises metric velocity scores and metric acceleration scores.

4. The computer implemented method according to claim 1, wherein the review window duration is inversely proportional to the activity score.

5. The computer implemented method according to claim 1, further comprising determining the univariate variation score for the system metrics according to a metric velocity score, wherein the metric velocity score comprises a mode of the metric velocity.

6. The computer implemented method according to claim 1, further comprising determining the univariate variation score for the system metrics according to a metric acceleration score, wherein the metric acceleration score comprises a mode of the metric acceleration.

7. The computer implemented method according to claim 1, further comprising detecting, by the one or more computer processors, system log data anomalies within the review window.

8. A computer program product for system log anomaly detection, the computer program product comprising one or more computer readable storage media and collectively stored program instructions on the one or more computer readable storage media, the stored program instructions comprising:
    program instructions to receiving multivariate time-series system log data and metric data;
    program instructions to receive a metric data causal graph including causal relationships between system metrics;
    program instructions to determine a univariate variation score for the system metrics;
    program instructions to determine a causal variation score for the multivariate time series system metric data according to the causal graph;
    program instructions to determine an activity score according to the univariate variation score, and causal variation score;
    program instructions to alter a review window duration according to the activity score; and
    program instructions to process windows of multivariate time-series system log data and metric data to detect anomalies.

9. The computer program product according to claim 8, the stored program instructions further comprising:
    program instructions to determine a metrics anomaly score according to a metric-based anomaly detector; and
    program instructions to determine the activity score according to the metrics anomaly score, univariate variation score, and causal variation score.

10. The computer program product according to claim 8, wherein the univariate variation score comprises metric velocity scores and metric acceleration scores.

11. The computer program product according to claim 8, wherein the review window duration is inversely proportional to the activity score.

12. The computer program product according to claim 8, further comprising determining the univariate variation score for the system metrics according to a metric velocity score, wherein the metric velocity score comprises a mode of the metric velocity.

13. The computer program product according to claim 8, further comprising determining the univariate variation score for the system metrics according to a metric acceleration score, wherein the metric acceleration score comprises a mode of the metric acceleration.

14. The computer program product according to claim 8, the stored program instructions further comprising program instructions to detect system log data anomalies within the review window.

15. A computer system for detecting system log anomalies, the computer system comprising:
    one or more computer processors;
    one or more computer readable storage devices; and stored program instructions on the one or more computer readable storage devices for execution by the one or more computer processors, the stored program instructions comprising:
    program instructions to receiving multivariate time-series system log data and metric data;
    program instructions to infer system metrics from the system log and metric data;
    program instructions to receive a metric causal graph including causal relationships between system metrics;
    program instructions to determine a univariate variation score for the system metrics;
    program instructions to determine a causal variation score for the multivariate time series system metric data according to the causal graph;
    program instructions to determine an activity score according to the univariate variation score, and causal variation score;
    program instructions to alter a review window duration according to the activity score; and
    program instructions to process windows of multivariate time-series system log data and metric data to detect anomalies.

16. The computer system according to claim 15, the stored program instructions further comprising:
    program instructions to determine a metrics anomaly score according to a metric-based anomaly detector; and
    program instructions to determine the activity score according to the metrics anomaly score, univariate variation score, and causal variation score.

17. The computer system according to claim 15, wherein the univariate variation score comprises metric velocity scores and metric acceleration scores.

18. The computer system according to claim 15, wherein the review window duration is inversely proportional to the activity score.

19. The computer system according to claim 15, further comprising determining the univariate variation score for the system metrics according to a metric velocity score, wherein the metric velocity score comprises a mode of the metric velocity.

20. The computer system according to claim 15, further comprising determining the univariate variation score for the system metrics according to a metric acceleration score, wherein the metric acceleration score comprises a mode of the metric acceleration.

* * * * *